United States Patent [19]

Tamura et al.

[11] 4,101,718

[45] Jul. 18, 1978

[54] BATTERY OF LAMINATED STRUCTURE HAVING BATTERY FRAME OF NOVEL STRUCTURE

[75] Inventors: Kohki Tamura; Kazuo Iwamoto, both of Hitachi, Japan

[73] Assignees: Hitachi Chemical Company, Ltd.; Hitachi, Ltd., both of Japan

[21] Appl. No.: 783,739

[22] Filed: Apr. 1, 1977

[30] Foreign Application Priority Data

Apr. 9, 1976 [JP] Japan .................................. 51-39245

[51] Int. Cl.$^2$ ............................................ H01M 8/04
[52] U.S. Cl. ....................................... 429/26; 429/38
[58] Field of Search ...................... 429/12, 13, 26, 38, 429/114

[56] References Cited

U.S. PATENT DOCUMENTS

| 2,985,702 | 5/1961 | Darland et al. ...................... 429/114 |
| 3,170,822 | 2/1965 | Babcock .............................. 429/114 |
| 3,235,407 | 2/1966 | Nicholson et al. .................... 429/38 |
| 3,515,593 | 6/1970 | Nichols ................................ 429/36 |
| 3,834,944 | 9/1974 | Dennison ............................. 429/26 |

*Primary Examiner*—John H. Mack
*Assistant Examiner*—H. A. Feeley
*Attorney, Agent, or Firm*—Craig & Antonelli

[57] ABSTRACT

In a battery of the structure laminated with plural cells a frame of the battery is divided into three equal spaces by barriers of insulating material. One of the spaces is a cathode active material chamber, another of the spaces is an anode active material, and the other is an electrolyte chamber. Cathode and anode plates are attached to one ends of the respective cathode active material and electrolyte chambers. The anode active material chamber is divided at one end thereof by an insulating partition plate formed integral with the frame. The plural frames attached with these anode and cathode plates are accumulated to form plural unit cells in such a manner that the chamber for the electrolyte of the frame of certain layer is disposed between the chambers for two materials different in the fore and aft layers from each other.

15 Claims, 8 Drawing Figures

BATTERY OF LAMINATED STRUCTURE HAVING BATTERY FRAME OF NOVEL STRUCTURE

BACKGROUND OF THE INVENTION

This invention relates to a battery, and more particularly to a battery of the structure laminated with plural cells adapted for a secondary or fuel battery.

The battery generally has plural cells in which an electrochemical reaction is taken place to generate an electromotive force. These cells are composed of three chambers such as an electrolyte chamber, cathode and anode active material chambers disposed at both sides of the electrolyte chamber, and cathode and anode plates are arranged at the respective boundaries of these chambers. Electromotive voltage and current obtained from these unit cells are much smaller than the values generally required, and in an actual battery such unit cells are laminated in large number and are electrically connected in series or parallel with each other. For example, as disclosed in U.S. Pat. No. 3,188,242, there is proposed a battery laminated with plural unit cells. In such battery terminals for electrically connecting the respective cells are attached to the cells and are connected outside of the frame of the battery by means of welding, soldering or screw clamping, etc. In such battery the resistance of conductors for electrically connecting these cells or an electric loss caused by the contact resistance at the connections of the conductors is however large enough to be unable to ignore. Further, since the connections of the conductors are externally exposed of the frames of the battery in such battery, it has such disadvantage that the volume and accordingly the weight of the entire battery is increased.

In a battery for practical use as much reduction of the volume, weight and further the cost of the battery as possible is at present most important subject. For the purpose of solving such subject, there have been tried several proposals. For example, it has been proposed an electrical connection between the cells of a battery by employing U-shape electrode plates. This proposal has been disclosed as Japanese Pat. application No. 110663/1973 already filed and disclosed in Japan by one of the inventors of this invention. According to this disclosed invention, good electronconductive material plate such as copper is, for example, bent in U-shape to form an electrode holding frame in a manner windows are provided at both sides of U-shape frame. The cathode and anode plates are respectively attached to the respective windows. There is provided partition frames between both sides of the U-shape frame for forming the cathode and anode active material chambers formed adjacent to each other. Then, these frames are accumulated in plural number to form a battery of the structure laminated with plural cells. In such battery the bottom of the U-shape electrode holding frame becomes an electric connection between the respective cells. However, since two chambers are provided between both sides of the U-shape frame in such structure of the electrode plates, the interval between both sides of the U-shape frame cannot be reduced, but the bottom surface of the U-shape frame becomes relatively long. As a result, the electric resistance of the connections between the respective cells cannot remarkably be decreased. In case a large number of such cells are laminated, the battery itself has considerably large internal resistance as the entire battery. In addition, it is difficult to work such U-shape electrode plates, this disclosed invention has such disadvantage that it is difficult to assemble a battery with such U-sahpe frames.

SUMMARY OF THE INVENTION

It is, therefore, an object of this invention to provide a battery of novel structure which has eliminated the aforementioned disadvantages of the conventional battery and has compact, light, easy to assemble and less expensive construction.

This object can be performed by the battery of the structure constructed as below, and which battery has the structure laminated with plural cells each comprising a cathode active material chamber and cathode plates, an electrolyte chamber, anode active material chamber and anode plates, said battery comprising plural frames forming said battery each having at least three spaces divided by barriers of insulating material, at least one of the spaces including cathode plates attached thereto, at least another of the spaces including anode plates attached thereto and the other of the spaces including insulating partition plates attached thereto, each frame accumulated in such a manner facing with the space different from the spaces of the frames laminated at both sides thereof thus forming a cathode active material chamber, an electrolyte chamber and an anode active material chamber.

DETAILED DESCRIPTION OF PREFERRED EMBODIMENTS

Figure 1:
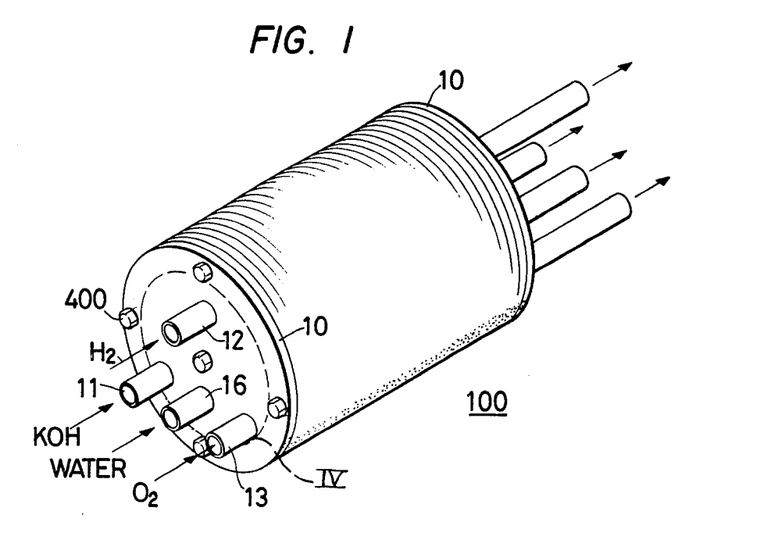
FIG. 1 is a view of the entire configuration of a fuel battery of one embodiment assembled according to this invention.

FIG. 1 shows a fuel battery 100 of the structure laminated with plural frames. A battery for practical use has a large number of frames such as, for example, several tens or several hundreds of frames accumulated therein. This embodiment of the battery of this invention employs circular frames and cylindrical configuration as its contour. These frames and the ends 100 thereof attached to both ends thereof are tightly fixed to each other by five bolts 400. It is to be noted that these frames and the ends 10 thereof attached to both ends thereof may be bonded with adhesive or the like. Four conduits 11, 12, 13 and 16 are attached to the respective ends 10, and an aqueous caustic potash solution (KOH), an oxygen gas ($O_2$) and a hydrogen gass ($H_2$) are supplied to the interior of the fuel battery 100 via these three conduits 11, 13 and 12, respectively. Water is supplied as cooling medium via the conduit 16. These frames and the ends 10 thereof are, for example, made of electrically insulating material such as plastic or the like.

Figure 2:
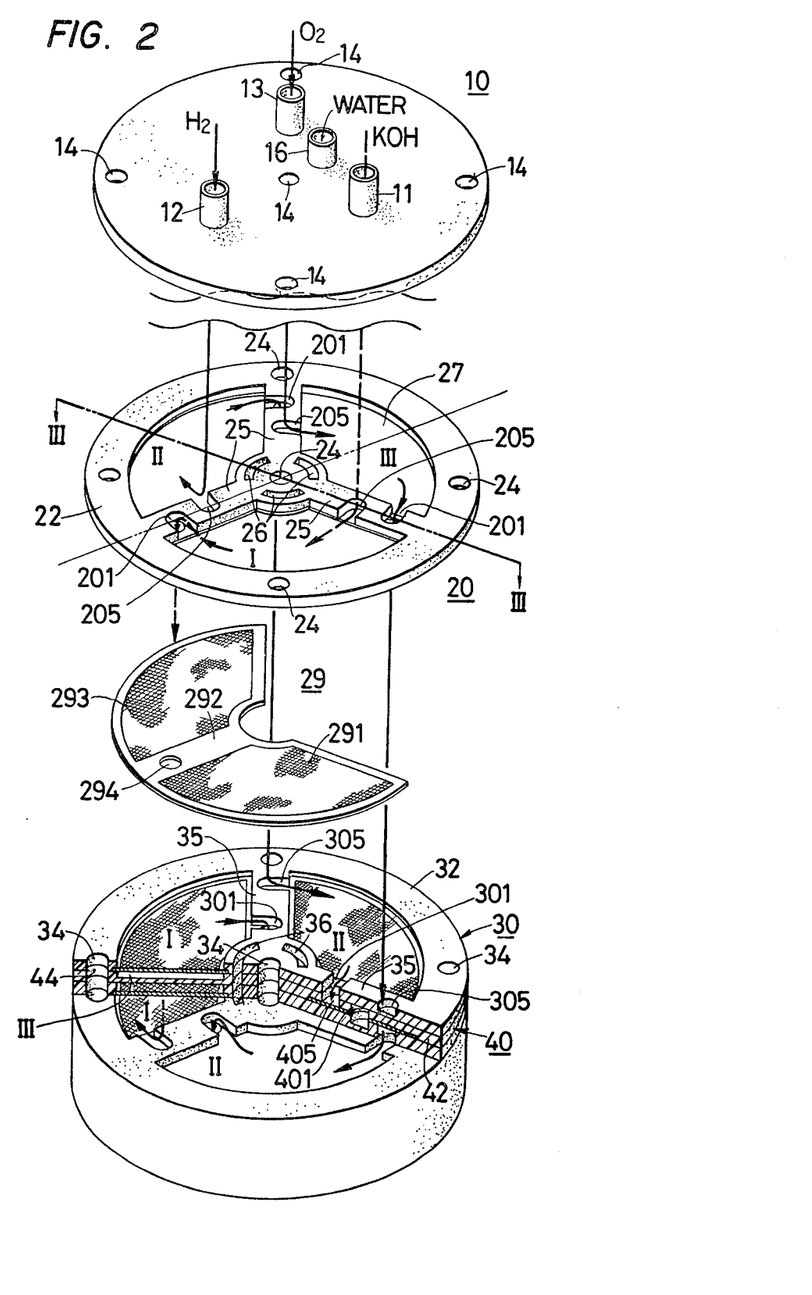
FIG. 2 is a partly exploded and partly fragmentary sectional view of the fuel battery shown in FIG. 1 for explaining the internal structure thereof.

FIG. 2 shows the ends 10 forming a fuel battery 10 and three frames 20, 30 and 40. The ends 10 have five small holes 14 to which the bolts 400 are inserted, as described above.

The frames 20 of first type have circular outer peripheral barrier 22 and three barriers 25 radially extended from the center, and three equal sector spaces I, II and II are formed by these barriers. The space I is an electrolyte chamber filled with aqueous caustic potash solution (KOH) as an electrolyte, the sapce II is an anode active material chamber filled with hydrogen gas ($H_2$) as an anode active material, and the space III is a cathode active material chamber filled with oxygen gas ($O_2$) as a cathode active material. The space III of these spaces is closed at the bottom by a partition plate made of insulating material. This partition plate is formed integrally with the frame 20. Other two spaces I and II are divided by electrode plates as will be hereinafter described in greater detail. Two grooves 201 and 205 are formed on the barriers 25 radially extended in three directions from the frames 20. One groove 205 is formed on the vicinity of the intermediate between the outer peripheral barrier 22 of the frame 20 and the center thereof, while the other groove 201 is formed at the outer peripheral barrier 22 side with respect to the groove 205. There is remained sufficient range to form a further groove at the center side of the groove 205. Each one groove 201 is formed counterclockwise and opened in the spaces I, II and III corresponding thereto. This groove 201 becomes outlets for the respective fluids, i.e., aqueous caustic potash solution, hydrogen gas and oxygen gas, etc. On the other hand, each groove 205 is formed clockwise and opened in the spaces I, II and III corresponding thereto. This groove 205 becomes an inlet for the respective fluids. Three arcuate holes 26 are formed at the positions corresponding to three sector spaces I, II and III in the vicinity of the center of the frames 20. Cooling medium of the conduit 16 such as, for example, water or the like is delivered through the grooves (not shown) formed on the ends 10 to these three holes 26. The cooling by such cooling medium particularly affects advantageously a battery of large type for generating a great deal of heat upon electrochemical reaction.

Figure 3:
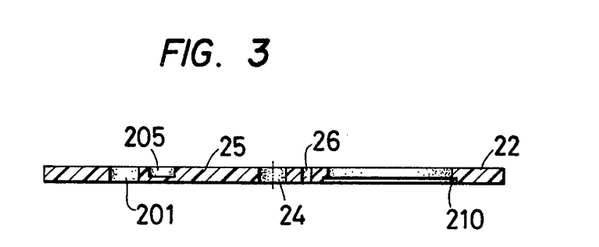
FIG. 3 is a sectional view of the frames of the battery along the line III—III in FIG. 2.

In FIG. 3, reference numeral 205 illustrates a groove formed in the vicinity of the intermediate of a radial barrier 25, and 201 represents a groove formed at the outside of the groove 205. As seen clearly from this sectional view in FIG. 3, the bottom of the groove 205 is closed as an inlet of the fluids, whereas the groove 201 is opened as an outlet of the fluids. Further, Numerals 24 and 26 are small holes for the bolts and for flowing the cooling medium. Stepwise recess 210 is formed at the periphery of the bottom of the spaces I and II, and electrode plates are engaged with the recess as will hereinafter be described in greater detail. Numeral 22 indicates outer peripheral barrier of the frame.

FIG. 2 further indicates an electrode plate 29 composed of a cathode plate 291, an anode plate 293 and an electrode holding frame 292. This frame 29 is made of, for example, thin plate or the like of good electroconductive material such as cooper or the like. This frame 292 has a configuration of a sector having an angle of approx. 240°, which has two equal sector windows having an angle of approx. 120° formed therein. Each window has the cathode and anode plates 291 and 293 tightly attached thereto. The electrode plates 29 thus constructed is engaged with the recess 210 on the outer peripheral barrier 22 of the frame 20 in such a manner that the cathode and anode plates 291 and 293 may correspond to the spaces I and II of the frame 20. This frame 292 has a small hole 294 formed at the position corresponding to the outlet 201 of the frame 20 of the first type. Such frame 292 may be easily fabricated such as by a pressing operation or the like. The attachment of the cathode and anode plates 291 and 293 to two windows of the frame 292 is tightly secured such as by a welding or the like. These cathode and anode plates 291 and 293 are fabricated by coating, for example, a mixture of metallic particles of silver, copper, nickel, etc. and resin on a metallic screen of nickel or the like known per se by those skilled in the art.

In FIG. 2, reference numerals 30 and 40 represent frames of second and third types. These frames 30 and 40 are constructed in the same structure as the frame 20 of first type except the position formed with the inlet and outlet. More particularly, a groove 305 as an inlet of the frame 30 is formed at the position corresponding to the outlet 201 of the frame 20 at the outer peripheral barrier 32 side from the center of the radial barrier 35. Accordingly, the fluids delivered from the spaces I, II and III of the frame 20 are introduced to the respective spaces I, II and III corresponding to the frame 30. A groove 301 as an outlet of the fluids is provided at the position corresponding to an inlet 405 of the frame 40 as will hereinafter be described in greater detail at the inside of the center of the radial barrier 35. Accordingly, the fluids delivered from the spaces I, II and III of the frame 30 are introduced to the spaces I, II and III of the frame 40. Then, a small hole is provided at the position corresponding to the outlet 301 at the electrode plate holding frame attached to the frame 30 in the same manner as the electrode holding frame 292.

In FIG. 2, there are provided a groove 401 as an outlet at the position corresponding to the inlet 205 of the frame 20 in the vicinity of the center of the radial barrier and a groove 405 as an inlet at the position corresponding to the outlet 301 of the frame 30 at the inside thereof at the frame of the third type designated by numeral 40. A small hole is provided at the position corresponding to the outlet 401 at the electrode holding frame of the electrode plates attached to the frame 40 of third type in the same manner as the aforesaid two electrode holding frames.

Figure 4:
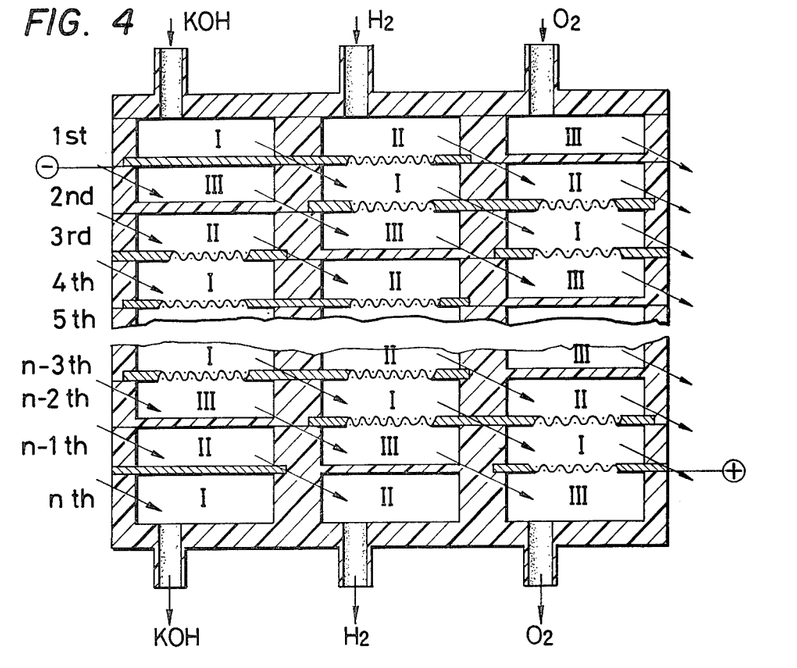
FIG. 4 is a developed view of the section of the battery taken by a cylindrical surface represented by a broken line IV in FIG. 1 for showing the interior of the battery.

Three types of the frames, 20, 30 and 40 attached with the respective electrode plates 29 thereto are sequentially accumulated to form a battery 100. The space such as the space I in the respective layers thus laminated in such construction is successively displaced by 120° at every layer from the first to the last layers. The spaces II and III are arranged in the same manner as the space I. The corresponding spaces in the respective layers are connected via the inlet and outlets to form a spiral fluid path. Thus, a cylindrical battery 100 shown in FIG. 1 is constructed, and a developed view of the cylindrical section taken by one-dotted broken line IV in FIG. 1 is shown in FIG. 4. In FIG. 4, n frames are laminated. However, the electrode plate is not attached to $n$-th frame. As shown in FIG. 4, there is provided terminals electrically connected to the electrode plates of the initial and $(n-1)$th layers thus laminated as an output terminal. However, it is preferable to employ the structure constructed as below as the electrode plates of the initial and $(n-1)$th layers with respect to the efficiency and cost, etc. of the battery. More particularly, as shown in FIG. 4, there is not provided a window cut out at the electrode holding frame of the electrode plates of the first frame attached with the cathode plate in attachment with the negative electrode output terminal of the battery thereto, but there is provided only an window of the anode plate. On the other hand, an positive output terminal is attached to the electrode plates of $(n-1)$th frame. There is not provided a window attached with the anode plates at the electrode holding frame of the electrode plates but only cathode plates are attached thereto.

The introduction of aqueous caustic potash solution (KOH), hydrogen gas ($H_2$) and oxygen gas ($O_2$) supplied to the interior of the battery 100 via the conduits 11, 12 and 13, respectively, will be described with reference to FIGS. 2 and 4. The aqueous caustic potash solution of the conduit 11 is delivered through the inlet 205 of the first frame to the electrolyte chamber I. This solution is fed via the outlet 201 of the first frame, the small hole formed at the electrode holding frame 292 of the electrode plate 29 and the inlet of the second frame 30 to the electrolyte chamber I of the second frame. Further, this solution is then delivered via the outlet 301 of the second frame 30, the small hole of the electrode plate and the inlet 405 of the third frame 40 to the electrolyte chamber I of the third frame 40. This solution is thus delivered in the same manner as described above via the electrolyte chambers I of n frames in spiral line and is then introduced to the conduit 11 of the end 10.

Similarly, the hydrogen gas and the oxygen gas are delivered via the anode active material chamber II and the cathode active material chamber III of n frames spirally arranged similarly in the interior of the battery to the conduits 12 and 13, respectively. The introduction of these fluids is merely shown by arrows in FIG. 4.

As clear from FIG. 4, in the battery of the structure laminated with the frames as described above first unit cell is composed of the anode active material chamber II of the first frame and the anode plates, the electrolyte chamber of the second frame and the cathode plate, and the cathode active material chamber III of the third frame. Second unit cell is composed of the anode active material chamber II of the second frame and the anode plates, the electrolyte chamber I of the third frame and the cathode plates, and the cathode active material chamber III of the fourth frame. The cathode plate of the first unit cell and the anode plate of the second unit cell are electrically connected via the electrode holding frames of the electrode plate of the second frame. Similarly, $(n-2)$th unit cell is composed of the anode active material chamber II of the $n-2$)th frame and the anode plates, the electrolyte chamber I of the $(n-1)$th frame and the plates, and the cathode active material chamber III of the last n-th frame, and the anode plates of this cell is electrically connected to the cathode plates of the $(n-3)$th unit cell via the electrode holding frame of the electrode plate of $(n-2)$th frame. As clear from the above description, according to this embodiment, a battery in which $(n-2)$ unit cells are electrically connected in series by laminating $n$ frames can be provided.

It is to be noted that the number of the spaces described as above may not be limited only to three as in this embodiment. For example, radial barriers may be provided at the three spaces of this embodiment to increase the number of the spaces of one frame. In this case two of the six spaces may be anode active material chambers, another two may be electrolyte chambers, and the other two may be cathode active material chambers.

Figure 5:
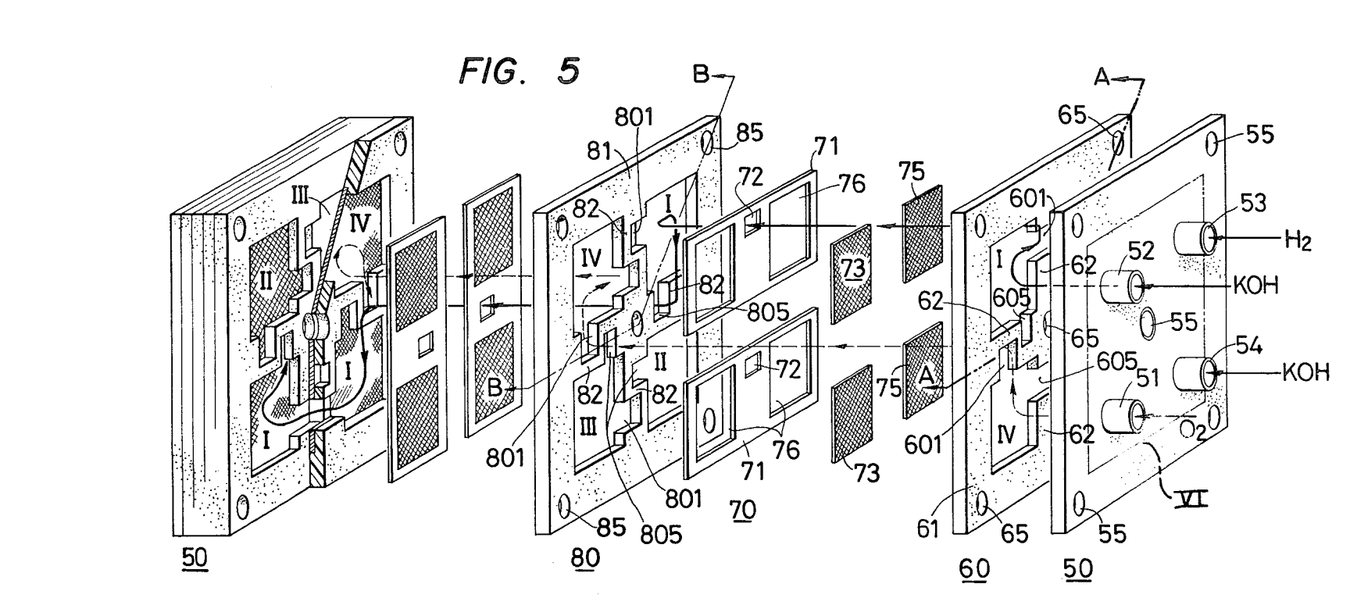
FIG. 5 is a partly exploded and partly fragmentary sectional view of another embodiment of the battery of this invention for describing the internal construction of the battery.

FIG. 5 shows a battery of the structure laminated with frames constructed other than before incorporating four spaces I, II, III and IV. In FIG. 5, reference numeral 50 represents the ends of the battery having four conduits 51, 52, 53 and 54 and five bolt holes 55. Further, the corresponding conduits are also provided at the other ends in the same manner as shown in FIG. 4. Aqueous caustic potash solution (KOH) is fed via the conduits 52 and 54 as the electrolyte, hydrogen gas ($H_2$) is fed via the conduit 53 as the anode active material, and oxygen gas ($O_2$) is fed via the conduit 53 to the interior of the battery. Cooling means is not shown in FIG. 5, but it may also be provided in the same manner as shown in FIG. 1. These ends 50 and frames which will hereinafter be described in greater detail may be fabricated by electrically insulating material such as, for example, plastic or the like in the same manner as the battery shown in FIG. 2 and may also be fixed tightly to each other with bolts or adhesive, and the like.

FIG. 5 shows frames of the types designated by numerals 60 and 70 used in this embodiment. The frame 60 of first type has a square outer peripheral barrier 61 and four barrier 62 to thereby form substantially square spaces I, II, III and IV. In Figures, these four spaces I, II, III and IV are sequentially arranged clockwise. The spaces I and III are electrolyte chambers filled with aqueous caustic potash solution, the space II is anode active material chamber filled with hydrogen gas, and the space IV is cathode active material chamber filled with oxygen gas. Two grooves 601 and 605 are formed on the four barriers 62 of the frames 60, respectively. The groove 605 as the inlet of the fluid is formed at the position near the center, and the groove 601 as the outlet of the fluid at the position near the outer peripheral barrier 61. The respective inlets 605 are opened clockwise toward the corresponding spaces I, II, III, and IV, while the respective outlets 601 are opened counterclockwise toward the corresponding spaces I, II, III and IV.

Figures 5A, 5B:
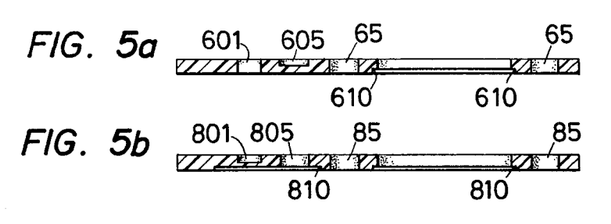
FIGS. 5(a) and 5(b) are sectional views of the frame taken along the lines A—A and B—B in FIG. 5.

FIGS. 5(a) and 5(b) show the sections taken along the lines A—A and B—B in FIG. 5, and in FIG. 5 (a), reference numerals 601 and 605 represent grooves as outlet and inlet formed at the respective barriers 62. As seen from these sectional views, the bottom of the groove 605 is closed as the inlet, while the bottom of the groove 601 as the outlet is opened. Further, in Figures, numeral 65 indicates bolt holes. Though partly shown, there is provided stepwise recess 610 on the bottom of the spaces I and II and on the periphery of the bottom of the spaces III and IV, and electrode plates are engaged at this portions as will hereinafter be described in greater detail.

FIG. 5 further shows two electrode plates designated by numeral 70 attached to the frame 60. One electrode plate is engaged with the recess on the bottom of the spaces I and II of the frame 60 and the other plate is engaged with the recess formed on the bottom of the spaces III and IV. Each of these two electrode plates 70 is composed of an electrode plate holding frame 71, a cathode plate 73 and an anode plate 75. The frame 71 is made of good electroconductive material such as copper in the same manner as the holding frame shown in FIG. 2. Two square cut out window 76 and small hole 72 are formed at the frame 71. Cathode and anode plates 73 and 75 fabricated by the same manner as shown in FIG. 2 are attached to these two windows 76. As clear from FIG. 5, the spaces I and IV of the frame 60 are divided at the bottoms thereof by the cathode plate, and the spaces II and III are divided at the bottoms thereof by the anode plate. The hole 72 formed at the electrode holding frame 71 is provided at the position corresponding to the outlet 601 of the frame 60.

In FIG. 5, there is shown frames 80 of second type. The frame 80 has the same structure as the frame 60 excluding the position formed with an inlet and outlet 805 and 801. The inlet 805 of the frame 80 is formed in the vicinity of an outer peripheral barrier 81 and the outlet 801 thereof is formed in the vicinity of the outlet 801. As clear from FIG. 5(b), the bottom of the groove 805 as the inlet is closed, while the bottom of the groove 801 as the outlet is opened. Bolt holes are designated by reference numeral 85. As seen from this sectional view, there is formed a recess 810 for engaging the electrode plate on the bottom of the spaces III and IV of the frame 80, becoming the same plane as the recess 810 on the back side of the barrier 82.

As clear from FIG. 5, the frames 60 and 80 of two types attached with the electrode plates 70 thereto are sequentially laminated to form a battery.

The introduction of aqueous caustic potash solution (KOH) supplied via the conduits 52 and 54, hydrogen gas ($H_2$) supplied via the conduit 53, and oxygen gas ($O_2$) supplied via the conduit 51, to the interior of the battery will now be described with reference to FIGS. 5 and 6. The aqueous caustic potash solution is introduced via the conduits 52 and 54 to the electrolyte chambers I and III of the first frames. This solution is introduced via the outlet 601 of the first frame 60, the hole 72 formed at the frame 71 of the electrode plate 70 and the inlet 805 of the second frame 80 to the electrolyte chambers I and III of the second frame. This solution is further introduced via the same path as above, the respective electrolyte chambers I and II of n frames to the conduits 52 and 54 of the end 50 spirally in the chambers I and III in the interior of the battery. The introduction of these fluids is shown by arrows in FIG. 5.

Figure 6:
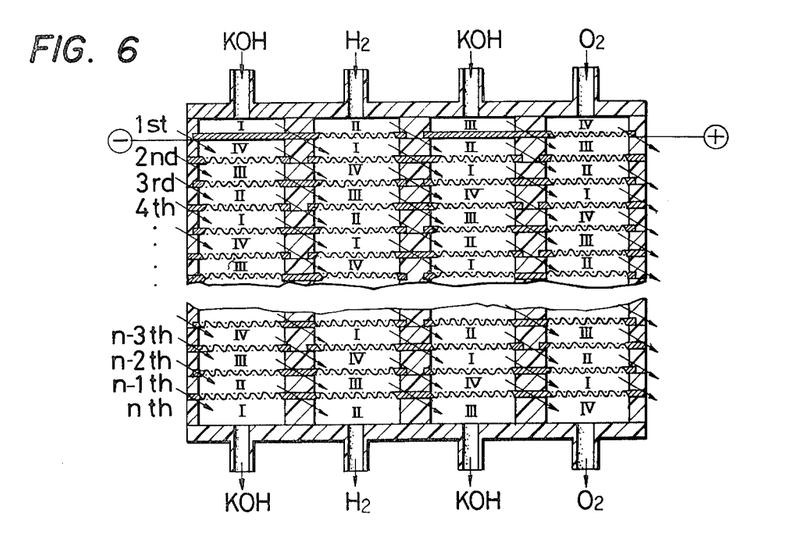
FIG. 6 is a developed view of the section taken by a plane designated by a broken line VI in FIG. 5 for showing the interior of the battery of another embodiment of this invention.

As shown in FIG. 6, two output terminals of the battery are attached to two electrodes, respectively of the first frame. The electrode plate is not attached to the last $n$-th frame, two electrodes of $(n-1)$th frame are electrically connected. It will be appreciated that the two electrode plates of this first frame may employ cathode and anode plates, respectively as described above but may preferably use electrode plates having the structure as will be described below in view of efficiency and cost of the battery. More particularly, as shown in FIG. 6, a cut out window for attaching the cathode plate is not provided at the electrode holding frame of the electrode plate of the first frame connected with negative output terminal but only anode plate is provided thereto. On the other hand, a cut out window for attaching the anode plate thereto is not formed at the electrode holding frame of the first electrode plate attached with positive output terminal. Another type of electrode plate for dividing the spaces I, II, III and IV is employed for $(n-1)$th frame. A cut out window is provided only at the portion corresponding to the electrolyte chambers I and III at the electrode holding frame of this electrode plate, and cathode and anode plates are electrically connected respectively thereto. These cathode and anode plates are electrically connected by the electrode holding frame.

As clear from FIG. 6, in the battery constructed as described above the first unit cell is composed of the anode active material chamber II of the first frame and the anode plates thereof, the electrolyte chamber I of the second frame and the cathode plates thereof, and the cathode active material chamber IV of the third frame. The second unit cell is composed of the anode active material chamber of the second frame and the anode plates thereof, the electrolyte chamber I of the third frame and the cathode plates thereof, and the cathode active material chamber IV of the fourth frame. The cathode plates of the first unit cell are connected to the anode plates of the second unit cell by the electrode holding frame of the electrode plates attached to the spaces I and II of the second frame. Similarly, $(n-2)$th unit cell is composed of the anode active material chamber II of the $(n-2)$th frame and the anode plates thereof, the electrolyte chamber I of $(n-1)$th frame and the cathode plates thereof, and the cathode active material chamber IV of $n$-th frame, and the anode plates of this cell are connected to the cathode plates of the $(n-3)$th cell. Further, in this embodiment, $(n-1)$th unit cell is composed of the anode active material chamber of the last $n$-th frame, the electrolyte chamber III of $(n-1)$th frame and the anode plates thereof, the cathode active material chamber IV of $(n-2)$th the frame and the cathode plates thereof. Similarly, $2(n-2)$th unit cell is composed of the anode active material chamber II of the third frame, the electrolyte chamber III of the second frame and the anode plates thereof, and the cathode active material chamber IV of the first frame and the cathode plates thereof. As clear from the aforementioned description, according to this embodiment, there can be obtained a battery in which $2(n-2)$ unit cells are electrically connected in series by laminating $n$ frames.

Table I shows the contour dimensions, volumes and weights of the batteries of two embodiments of this invention and of one utilizing U-shape electrode plates disclosed as the prior art example. These batteries employ 30% aqueous caustic potash solution as the electrolyte, oxygen gas as cathode active material and hydrogen gas as anode active material, and are operated at 65° C. of the operating temperature.

Table I

|  | U-shape Electrode plate | Three Chamber frame | Four Chamber frame |
|---|---|---|---|
| Contour sizes | 1.8cm × 18cm × 30.5cm | 34.2cm$^\phi$ × 10.2cm | 35cm × 35cm × 5.4cm |
| Volume | 9914.4 ml. | 9363.6 ml. | 6615.0 ml. |
| Weight | 14.46 kg. | 11.93 kg. | 10.68 kg. |
| Power(W)/Volume(l) | 92.96 | 98.42 | 139.32 |
| Power(W)/Weight(kg.) | 63.75 | 77.26 | 86.30 |

As clear from the above Table I, the output power per unit volume of the battery utilizing the U-shape electrode plate is 92.96, while the output power per unit volume of the batteries of two embodiments of this invention are increased to 98.42 and 139.32. The output power per unit weight of the battery utilizing the U-shape electrode plate is 63.75, while the output power per unit volume of the batteries of two embodiments of this invention are increased to 77.26 and 86.30.

In order to provide the same conditions of these batteries for comparison with each other, these batteries are constructed under the conditions such that the number of the cells of the batteries of each type is 60, the current density of the unit cell is 75 mA/cm$^2$, the electromotive force of the unit cell, and the total area of the electrode is 15,360 cm$^2$, and their output power becomes 921.6 W, and their comparisons are conductd based on the data obtained by these results as to the contour sizes, volumes and weights of these three batteries.

It may also provide a zinc-air secondary battery according to this invention by using an oxygen in the air as the cathode active material, zinc as the anode active material, and caustic potash as the electrolyte. When the output power per unit weight of the zinc-air secondary battery of such structure is compared with the conventional battery, it is also increased to 110 W/kg. compared with 90 W/kg. of the conventional battery. In such zinc-air secondary battery, the zinc plate can be engaged in the anode chamber to provide anode plates, and zinc particles are filled in the anode chamber and zinc is coated on nickel screen to form an electrode to be used therein.

What we claim:

1. A battery having a plurality of unit cells, each cell including a chamber for cathode active material, a chamber for electrolyte, and a chamber for anode active material, the chamber for the electrolyte constructed to be disposed between the other two chambers, and fluid path means for supplying the electrolyte and respective materials to the corresponding chambers, said battery further comprising:
   a frame formed of insulating material and including three spaces divided by walls, the first of the spaces used as the chamber for the electrolyte, the second of the spaces used as the chamber for the anode active material, and the third of the spaces closed at one end thereof by insulating material and formed with the chamber for the cathode active material,
   an electrode plate attached to one end of said first and second spaces in a manner the first space is formed with a chamber for the electrolyte and the second space is formed with a chamber of the anode active material, and
   a plurality of said frames attached with said electrode plate, forming said unit cell in a manner that the frames are so positioned that the chamber for the electrolyte of the frame of one layer is disposed between the chambers for the anode and cathode active materials of the two adjacent frames of the two adjacent layers.

2. A battery as defined in claim 1, wherein said electrode plate is formed of electroconductive material and is composed of an electrode holding frame including a window at the position corresponding to the first and second spaces of said frame and an anode and cathode plates attached to the corresponding windows of the holding frame.

3. A battery as defined in claim 1, wherein the walls of the insulating materials of said frame divide equally to the three chambers, and said frames attached with said electrode plate thereto are laminated at the positions rotated by 120°.

4. A battery as defined in claim 1, wherein said fluid path means for supplying the electrolyte and respective materials to the corresponding chambers includes said walls for dividing the respective spaces of said frames having a groove for said fluid path means in a manner that the respective fluids are introduced via the groove, whereby the corresponding chambers of the frame of the respective layers laminated are spirally connected as the fluid path.

5. A battery as defined in claim 1, wherein a hole is formed at part of the wall of the insulating material of said respective frames, whereby cooling material is introduced via the frame of the respective layers laminated.

6. A battery having a plurality of unit cells, each cell including a chamber for cathode active material, a chamber for electrolyte, and a chamber for anode active material, the chamber for the electrolyte constructed to be disposed between the other two chambers, and fluid path means for supplying the electrolyte and respective materials to the corresponding chambers, said battery further comprising:
   a frame formed of insulating material and including four spaces divided by walls, the first and second of the spaces used as the chamber for the eletrolyte, the third of the spaces used as the chamber for the anode active material, and the fourth of the spaces used as the chamber for the cathode active material,
   first electrode plate attached to one respective end of the first and third spaces of said frames in a manner that the first space is formed with the chamber for the electrolyte and the third space is formed with the chamber for the anode active material,
   second electrode plate electrically insulated from said first electrode plate and attached to one end of the second and fourth spaces of said frame in a manner that the second space is formed with the chamber for the electrolyte and the fourth space is formed with the chamber for the cathode active material, and
   a plurality of said frames attached with said two electrode plates, forming said unit cell in a manner that the frames are so positioned that the chambers for the electrolyte of the frame of one layer is disposed between the chambers for the anode active material and cathode active material of the two adjacent frames of the two adjacent layers.

7. A battery as defined in claim 6, wherein each of said first and second electrode plates is formed of electroconductive material and is composed of an electrode holding frame including a window at the position corresponding to the two spaces of said frames and an anode and cathode plates attached to the corresponding window of the holding frame.

8. A battery as defined in claim 6, wherein the walls of the insulating materials of said frame divide equally to the four chambers, and said frames attached with said two electrode plates thereto are laminated at the position rotated by 90°.

9. A battery as defined in claim 6, wherein said fluid path means for supplying the electrolyte and respective materials to the corresponding chambers includes said walls for dividing the respective spaces of said frames having a groove for said fluid path means in a manner that the respective fluids are introduced via the groove, whereby the chambers corresponding to the frame of the respective layers laminated are spirally connected as the fluid path.

10. A battery as defined in claim 6, wherein a hole is formed at part of the wall of the insulating material of said respective frames, whereby cooling material is introduced via the frame of the respective layers laminated.

11. A battery comprising a plurality of unit cells, each unit cell including a chamber for cathode active material; a chamber for electrolyte; and a chamber for anode active material; the chamber for electrolyte constructed to be disposed between the other two chambers; cathode and anode plates attached to the electrolyte chamber and anode active material chamber, respectively; each of the three chambers for each unit cell being formed in an adjacent frame member made of insulating material; each frame containing an electrolyte chamber, an anode active material chamber, a cathode active material chamber; and means for supplying the electrolyte and respective materials to the corresponding chambers comprising grooves in said frames adapted to feed material from one chamber in one frame to the corresponding chamber in the next adjacent frame.

12. A battery comprising a plurality of unit cells, each unit cell including a chamber for cathod active material; a chamber for electrolyte; and a chamber for anode active material; the chamber for electrolyte constructed to be disposed between the other two chambers; the three chambers for each unit cell being formed in adjacent frame members made of insulating material; each frame member containing two chambers for electrolyte, one chamber for cathode active material, and one chamber for anode active material; an electrode plate attached to the anode active material chamber and one of the electrolyte chambers of each frame member; a second electrode plate attached to the cathode active material chamber and the other of the electrolyte chambers in each frame member; and means for supplying the electrolyte and respective materials to the corresponding chambers comprising grooves in said frames adapted to feed material from one chamber in one frame to the corresponding chamber in the next adjacent frame.

13. A frame member for a battery comprising:
(a) wall portions, made of an insulating material, dividing said frame into three separate spaces, one of said spaces closed at one end thereof by insulating material, the other two spaces being adapted to hold electrode plates, and
(b) groove means in each of said wall portions for passing material in each of said spaces to a corresponding space in the next adjacent frame.

14. A frame member for a battery comprising:
(a) wall portions, made of an insulating material, dividing said frame into four separate spaces, an adjacent two of said spaces being adapted to hold one electrode plate, the other two spaces being adapted to hold a second electrode plate, and
(b) groove means in each of said wall portions for passing material in each of said spaces to a corresponding space in the next adjacent frame.

15. A method of circulating electrolyte and anode active and cathode active materials in a battery comprised of a plurality of unit cells, each unit cell including a chamber for cathod active material, a chamber for electrolyte, and a chamber for anode active material, each of these chambers being formed in an adjacent frame member, each of said frame members having electrolyte, anode active material, and cathode active material chambers, said battery having $n$ frames, said method comprising:
(1) passing said electrolyte, said anode active material, and said cathode active material to said electrolyte, anode active material, and cathode active material chambers, respectively, of the initial frame member;
(2) passing said electrolyte, said anode active material, and said cathode active material from the respective chambers in the frame member to corresponding chambers in the next frame member;
(3) passing said electrolyte, said anode active material, and said cathode active material from the respective chambers in the frame member to the corresponding chambers in the next frame member until said electrolyte, said anode active material, and said cathode active material is in the $n^{th}$ frame; and
(4) passing said electrolyte, said anode active material, and said cathode active material out of said battery.

* * * * *